United States Patent
Liu

(10) Patent No.: US 8,009,448 B2
(45) Date of Patent: Aug. 30, 2011

(54) FORWARD-FLYBACK CONVERTER WITH ACTIVE-CLAMP CIRCUIT

(75) Inventor: Yen-Ming Liu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 390 days.

(21) Appl. No.: 12/417,780

(22) Filed: Apr. 3, 2009

(65) Prior Publication Data
US 2010/0067259 A1    Mar. 18, 2010

(30) Foreign Application Priority Data

Sep. 17, 2008    (TW) ................................ 97135714 A

(51) Int. Cl.
*H02H 7/122*    (2006.01)
(52) U.S. Cl. ............... 363/56.12; 363/21.02; 363/21.01; 363/21.04; 363/21.09
(58) Field of Classification Search ............... 363/56.12, 363/20, 21.01, 21.02, 21.04, 21.09
See application file for complete search history.

(56) References Cited

U.S. PATENT DOCUMENTS

| 5,598,324 | A | * | 1/1997 | Imamura et al. | ........... 363/21.02 |
| 6,069,803 | A | * | 5/2000 | Cross | ........... 363/21.14 |
| 6,366,474 | B1 | * | 4/2002 | Gucyski | ........... 363/20 |
| 6,496,392 | B2 | * | 12/2002 | Odell | ........... 363/56.11 |
| 7,649,757 | B2 | * | 1/2010 | Lin | ........... 363/56.12 |
| 7,920,391 | B1 | * | 4/2011 | Vinciarelli | ........... 363/17 |
| 2004/0085050 | A1 | * | 5/2004 | Jinno | ........... 323/247 |
| 2004/0179377 | A1 | * | 9/2004 | Tamura | ........... 363/16 |
| 2008/0084723 | A1 | * | 4/2008 | Balakrishnan et al. | ........... 363/97 |
| 2009/0268489 | A1 | * | 10/2009 | Lin et al. | ........... 363/50 |

* cited by examiner

*Primary Examiner* — Bao Q Vu
(74) *Attorney, Agent, or Firm* — Volpe and Koenig, P.C.

(57) ABSTRACT

The present invention discloses a forward-flyback converter with active-clamp circuit. The secondary side of the proposed converter is of center-tapped configuration to integrate a forward circuit and a flyback circuit. The flyback sub-circuit operating continuous conduction mode is employed to directly transfer the reset energy of the transformer to the output load. The forward sub-circuit operating discontinuous conduction mode can correspondingly adjust the duty ratio with the output load change. Under the heavy load condition, the mechanism of active-clamp flyback sub-circuit can provide sufficient resonant current to facilitate the parasitic capacitance of the switches to be discharged to zero. Under the light load condition, the time interval in which the resonant current turns from negative into positive is prolonged to ensure zero voltage switching function. Meanwhile, the flyback sub-circuit wherein the rectifier diode is reverse biased is inactive in order to further reduce the power losses.

10 Claims, 16 Drawing Sheets

FORWARD-FLYBACK CONVERTER WITH ACTIVE-CLAMP CIRCUIT

FIELD OF THE INVENTION

The present invention relates to isolated DC/DC converters and AC/DC converters. More particularly, the present invention relates to a forward-flyback converter having an active-clamp circuit. The major characteristics of this power conversion technique are transferring the input power to the secondary side continuously, having relatively better conversion efficiency for load variation in a wide range and relatively better cost-effectiveness.

BACKGROUND OF THE INVENTION

Since the functions of the electronic products on the market are reinforced, the power supply is demanded to provide relatively greater output energy as a response. At the same time, the products are demanded to have smaller volume and lighter weight. These trends form two requirements towards the power converters: raising the power density and improving the conversion efficiency. Based on these two requirements, a large amount of active-clamp forward-flyback converters and their derivative circuits are applied to various power supply products due to their advantages of transmitting energy to the output continuously and having soft-switching function for the power switch.

FIG. 1 shows a circuit diagram of a conventional active-clamp forward-flyback converter, which has a DC power source Vin for providing a DC input voltage, a main switch S1, an auxiliary switch S2, a resonant inductor Lr, a resonant capacitor Cr (contributed by the sum of the parasitic capacitances of S1 and S2), a clamp capacitor Cc, a transformer Tr having a primary winding N1, a first secondary winding N2 and a second secondary winding N3 (the turn ratio of N1, N2 and N3 are: n1:n2:n3), a first diode D1, a second diode D2, an output inductor Lo, an output capacitor Co, and a load $R_L$. The active-clamp forward-flyback converter can supply a stable DC voltage Vo. Moreover, the secondary side of transformer Tr with the central-tapped design could transfer energy to the output during the turn-on and the turn-off period of the main switch S1 such that the circuit has a larger energy processing capability. Meanwhile, current could be continuously outputted during a switching period. This feature produces smaller current ripples on the output capacitor such that the capacitance of output filter is smaller. Besides, the incorporation of the active-clamp circuit into the forward-flyback topology provides three main functions: clamping the voltage spike across switch S1 while this switch is turned off, magnetic reset of transformer, and achieving zero-voltage-switching (ZVS) for the power switches. Also, ZVS function could effectively decreases the switching losses of the power switches such that higher switching frequency could be chosen to reduce the volumes and weights of the passive elements.

The ZVS of main switch S1 of the active-clamp forward-flyback converter happens in predetermined dead time. This small interval is arranged between after auxiliary switch S2 is turned off and before main switch S1 is turned on. Within this interval, the current $i_{S1}$ flowing through the main switch S1 resonates to the negative direction so as to discharge the parasitic capacitance of switches to be zero value, and then force the anti-parallel diode of main switch S1 to conduct. When the anti-parallel diode of main switch S1 is conducting, main switch S1 is turned on to achieve ZVS operation. However, in the actual circumstance, the ZVS of main switch S1 could not be smoothly achieved as aforementioned. The reason is explained as follows. FIG. 2 is a circuit diagram showing discharge process of the parasitic capacitance of switches of the active-clamp forward-flyback converter. At the moment, the current of the second secondary winding N3, $i_{N3}$, is decreased gradually and the current of the first secondary winding N2, $i_{N2}$, is increased gradually. With the increase of $i_{N2}$, the current of the primary winding N1, $i_{N1}$, will turn into flowing into the dot from flowing out the dot according to Ampere's law. When the current $i_{N1}$ flows into the dot, the current $i_{S1}$ rapidly turns into small and correspondingly the discharging speed of the parasitic capacitance of switches Cr is dramatically decreased. Due to the aforesaid feature, $V_{Cr}$ could not be decreased to zero before main switch S1 is turned on. As a result, the ZVS could not be effectively achieved when main switch S1 is turned on, which is detrimental to conversion efficiency improvement and this drawback becomes serious under the heavy load condition. To overcome this drawback, the increasing speed of the current of the first secondary winding N2, $i_{N2}$, is curbed when the parasitic capacitance of switches Cr is discharging via adding an extra inductor or a saturable reactor between the first secondary winding N2 and the first diode D1 in the prior art of this field. The addition of extra inductor or reactance is actually helpful to achieve the ZVS of main switch S1 and effectively solve the over-heating problem of the switch. However, the extra inductor or reactance will induce quite a lot of iron loss when operating at high frequency. Hence, there is still a space of improvement for solving this problem.

Different from the active-clamp forward-flyback converter, the active-clamp flyback converter does not have the first secondary winding N2 transmitting the energy forwardly. As a result, the resonant current $i_{Lr}$ would not become small dramatically so as to influence the ZVS function of main switch S1 when the parasitic capacitance of switches Cr is discharging. In the active-clamp flyback converter, the peak value and the valley value of the resonant current $i_{Lr}$ would be determined by the value of the load $R_L$. The resonant current $i_{Lr}$ would have relatively larger peak and valley values under the heavy load condition. Therefore, it would facilitate the ZVS of main switch S1 under the heavy load condition.

For effectively improving the ZVS scheme of active-clamp forward-flyback converter under the heavy load condition, using the ZVS design of the active-clamp flyback converter is a feasible strategy. Besides, due to the requirements of load variation in a wide range, the efficiency performance at light load has been getting more and more attention. Since the two sub-circuits of the secondary side are both conducted, more conduction losses are correspondingly induced under the light load operation. In the specification of the voltage regulator module (VRM) newly published by Intel (VRM/EVRD 11.1), the requirements for improving the efficiency under the light load condition are set out. Although this kind of specifications are not adopted in the communication systems or in other industrial fields using the isolated power converters, this requirement is most likely to be proposed in the near future.

Keeping the drawbacks of the prior arts in mind, and employing experiments and research full-heartily and persistently, the applicant finally conceived a forward-flyback converter with an active-clamp circuit.

SUMMARY OF THE INVENTION

It is therefore an object of the present invention to provide an active-clamp forward-flyback converter for load variation in a wide range and having relatively higher conversion efficiencies under both the heavy and light loads. Under the heavy load condition, the ZVS scheme of the active-clamp flyback converter is employed to improve the drawback of insufficient resonant current in the conventional active-clamp forward-flyback converter. Under the light load condition, the time interval in which the resonant current turns from negative into positive is prolonged to assure that the main switch could achieve ZVS. Meanwhile, the diode of the flyback sub-circuit is designed to be reverse biased such that this sub-circuit is inactive and therefore the unnecessary element power losses are reduced.

It is therefore another object of the present invention to design the flyback sub-circuit at the secondary side to operate in continuous conduction mode (CCM) and the cathode of its diode to connect to the positive terminal of the output capacitor. As a result, magnetic reset energy of the transformer could be directly transmitted to the output capacitor and the load side via the secondary winding of the flyback sub-circuit to facilitate the energy conversion.

It is therefore another object of the present invention to increase a flywheeling diode in the forward sub-circuit at the secondary side such that the slope of the output inductor current is not influenced by the clamp capacitor voltage. Moreover, the output inductor is designed to operate in discontinuous conduction mode (DCM). Therefore, the duty ratio D will automatically decrease when the load becomes light, and the clamp capacitor voltage also becomes decreased correspondingly. When the load becomes further light, the clamp capacitor voltage is reduced so that the voltage across the secondary winding of the flyback sub-circuit is not high enough to forward bias the diode of the flyback sub-circuit. At the moment, the flyback sub-circuit is inactive so as to decrease the unnecessary element power losses. As a result, the efficiency of the present invention under the light load condition could be improved. Meanwhile, the starting point of this mechanism could be determined by properly arranging the turns ratio of the primary and secondary windings. In general, the starting point is chosen at the load condition with too low efficiency.

It is therefore another object of the present invention to let the DCM forward sub-circuit keep supplying the output power under the light load condition, so that the present invention is equivalent to an active-clamp DCM forward converter. The flyback sub-circuit does not influence the process in which the resonant current turns from negative into positive; thus, the slope of the resonant current is relatively gradual. The time in which the resonant current remains negative will be prolonged, and this feature facilitates to realize ZVS of the main switch under the light load condition.

It is therefore another object of the present invention to cause the reverse biased voltages of the diodes to be lower than those of the conventional active-clamp forward-flyback converter such that lower voltage rated diodes could be chosen. Meanwhile, due to the DCM operation, the output inductance is far smaller than that of a conventional active-clamp forward-flyback converter. Therefore, the volume and cost of the output inductor could be reduced so as to have cost-effectiveness.

The present invention may best be understood through the following descriptions with references to the accompanying drawings, in which:

DETAILED DESCRIPTION OF THE PREFERRED EMBODIMENT

Figure 3:
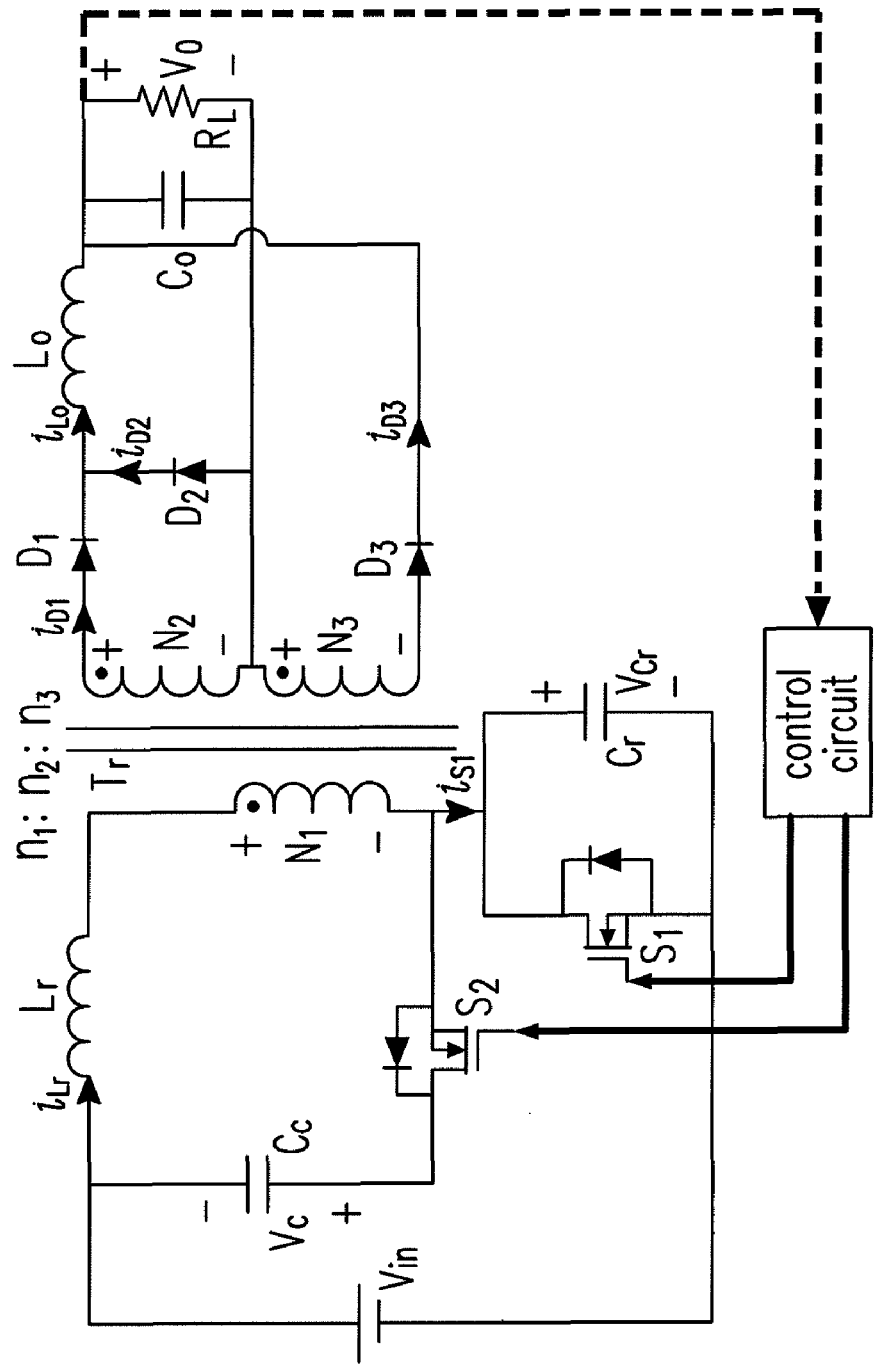
FIG. 3 shows a circuit diagram of a forward-flyback converter with the buck-boost type active-clamp circuit according to the first preferred embodiment of the present invention.

FIG. 3 shows a circuit diagram of a forward-flyback converter with the buck-boost type active-clamp circuit according to the first preferred embodiment of the present invention, it includes a forward-flyback converter with the buck-boost type active-clamp circuit and a control circuit. Through the control circuit, an output voltage regulation and a rapid response function under dynamic load variation could be achieved. The polarities of each voltage amount and the direction of each current amount of the active-clamp forward-flyback converter are defied in FIG. 3. With the use of transformer Tr, the input energy could be transmitted continuously to the output terminal via the secondary windings N2 and N3 of the transformer Tr and the flyback sub-circuit could be deactivated under the light load condition. The transformer Tr includes a primary winding N1, a first secondary winding N2 and a second secondary winding N3, and the turns ratio of the windings N1, N2 and N3 is: n1:n2:n3. The windings N2 and N3 are designed to be wound at the second side and connected to each other in series; thus, a winding of center-tapped configuration or two separate windings could be used. In the present invention, the preferred embodiments of the active-clamp forward-flyback DC/DC converter are explained as follows.

Figure 4:
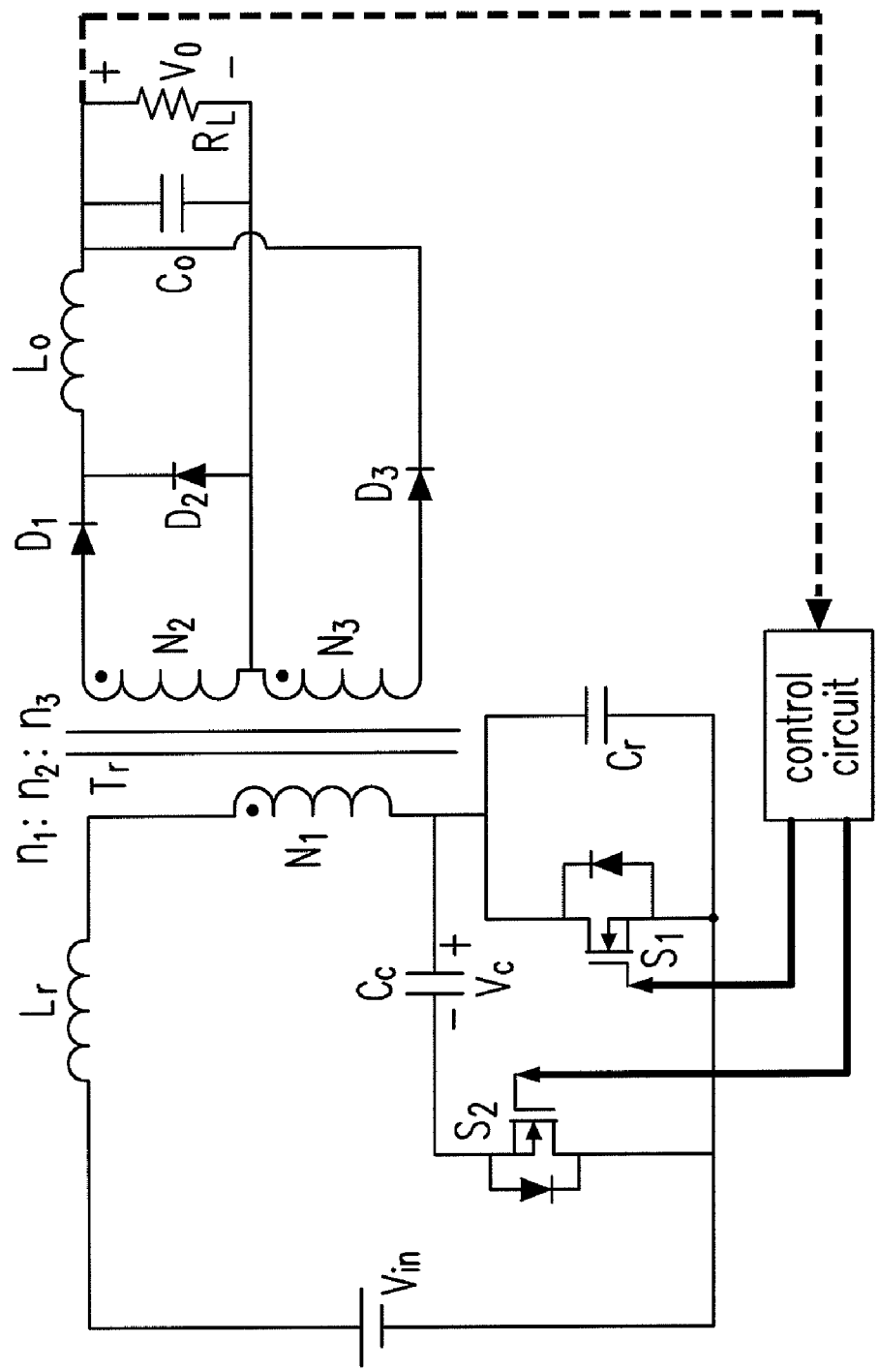
FIG. 4 shows a circuit diagram of a forward-flyback converter with the boost type active-clamp circuit according to the second preferred embodiment of the present invention.
Figure 5:
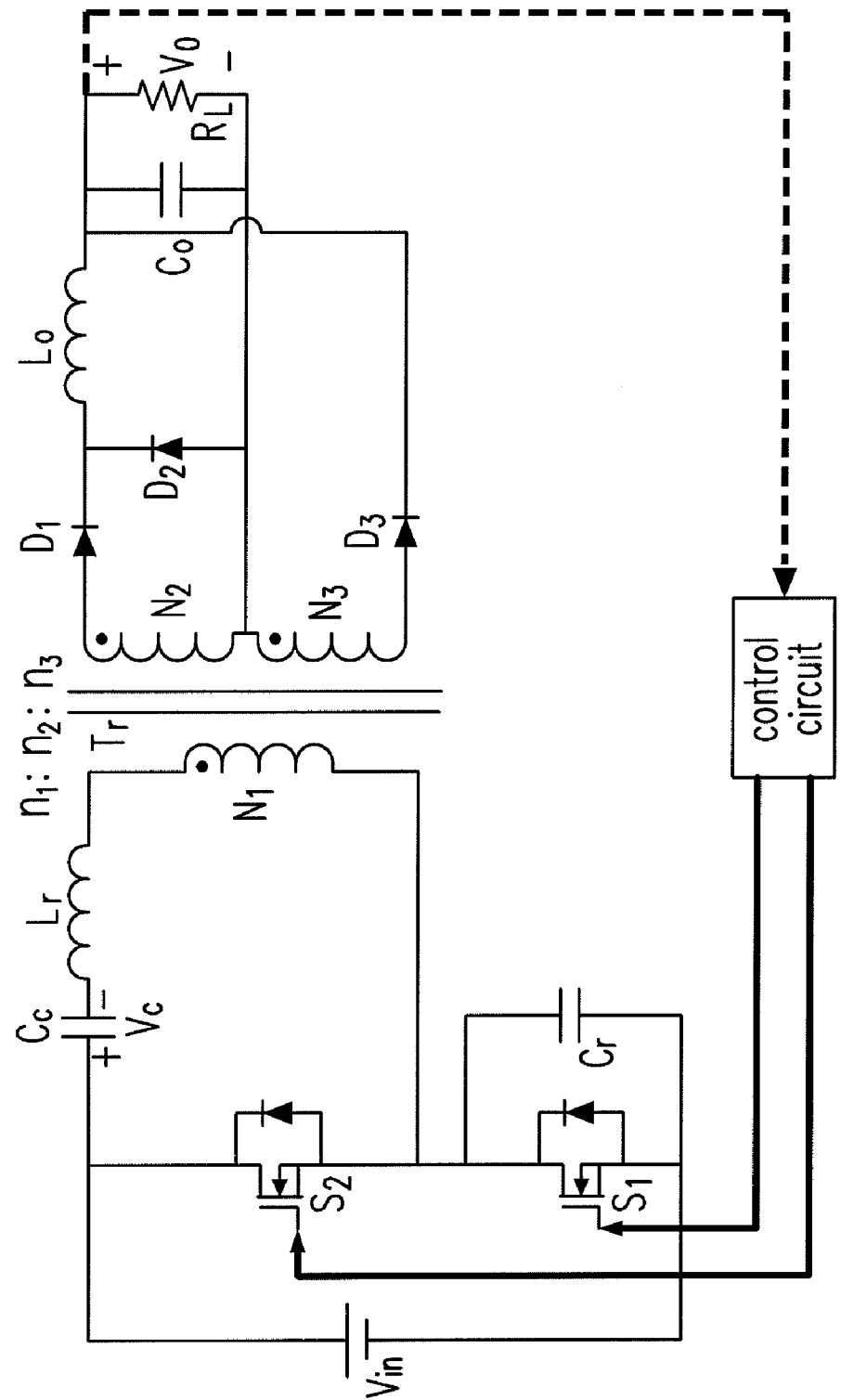
FIG. 5 shows a circuit diagram of a forward-flyback converter with the buck type active-clamp circuit according to the third preferred embodiment of the present invention.

As shown in FIG. 3, the primary side of the transformer includes a DC power source Vin, winding N1, resonant inductor Lr located between the DC power source Vin and the winding N1, main switch S1, auxiliary switch S2, and resonant capacitor Cr parallel with the main switch, wherein the resonant inductor Lr could be the leakage inductance of the transformer Tr or an external inductor, or the combination thereof. The main switch S1 and the auxiliary switch S2 are both MOSFET having an anti-parallel diode. The resonant capacitance Cr represents the sum of the parasitic capacitances contributed by main switch S1 and auxiliary switch S2. The main switch S1 connects to the first winding (primary winding) N1 via its drain, and connects to a negative terminal of the DC power source Vin via its source. The most commonly used realization of the active-clamp circuit is the buck-boost type, as shown in FIG. 3. That is, one end of the clamp capacitor Cc connects to the connecting node of the resonant inductor Lr and the input DC power source Vin and the other end connects to the drain of the auxiliary switch. Alternatively, a boost type design could be used, and FIG. 4 shows a circuit diagram of a forward-flyback converter with the boost type active-clamp circuit according to the second preferred embodiment of the present invention. Or a buck type design could be used, and FIG. 5 shows a circuit diagram of a forward-flyback converter with the buck type active-clamp circuit according to the third preferred embodiment of the present invention. In FIGS. 3, 4 and 5, the secondary side of the transformer Tr includes a forward sub-circuit comprising the second winding (first secondary winding) N2, the first diode D1, the second diode D2 and the output inductor Lo. In which, the output inductor Lo operates in DCM. Furthermore, a flyback sub-circuit operating in CCM is also included. This sub-circuit comprises the third winding (second secondary winding) N3 and the third diode D3, wherein the cathode of the diode D3 connects to the positive terminal of the output capacitor Co. When the present invention is employed in the application having relatively low output voltage and relatively large output current, the diodes D1, D2 and D3 could be replaced by MOSFETs, that is synchronous rectifier technique.

Figure 6:
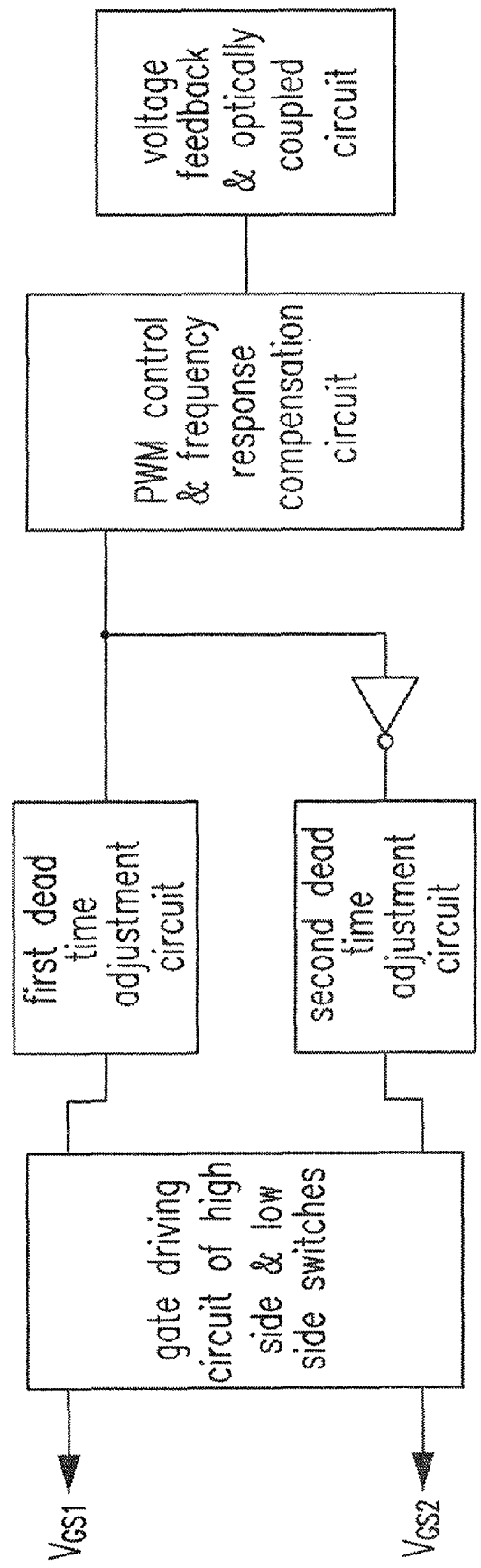
FIG. 6 shows a functional block diagram of a control circuit of an active-clamp forward-flyback converter according to the first to the third preferred embodiments of the present invention.

FIG. 6 shows a functional block diagram of a control circuit of an active-clamp forward-flyback converter according to the first to the third preferred embodiments of the present invention. The control circuit includes an output voltage feedback circuit, a photo-coupler, a PWM control and frequency response compensation circuit, an Inverter gate, a first dead time adjustment circuit (it is a dead time adjustment circuit of main switch S1), a second dead time adjustment circuit (it is a dead time adjustment circuit of auxiliary switch S2), and a gate driving circuit of high side and low side switches.

According to the states of whether the switch is turned on and whether the diode is conducted, each switching period could be divided into eight states. FIGS. 7(a)-7(h) show topological states of a forward-flyback converter with the buck-boost type active-clamp circuit according to the first preferred embodiment of the present invention. To simplify the analysis, in FIGS. 7(a)-7(h), the magnetizing inductance Lm is considered to be connected between the two terminals of the first winding (the primary winding) N1 of the transformer Tr, and the operations of the control circuit are not shown. FIG. 8 shows respective waveforms of an active-clamp forward-flyback converter under heavy load and light load according to the first preferred embodiment of the present invention. $v_{GS1}$ and $v_{GS2}$ are respective gate driving signals of switches S1 and S2, $v_{N1}$ is the voltage across the primary winding N1. $v_{Cr}$ is the voltage of the resonant capacitor Cr. $i_{Lr}$ is the current flowing through the resonant inductor Lr. $i_{Lm}$ is the current flowing through the magnetizing inductance Lm of the transformer Tr. $i_{D1}$, $i_{D2}$ and $i_{D3}$ are currents flowing through diodes D1, D2 and D3, respectively.

According to the topological state diagrams of FIGS. 7(a)-7(h) and the steady state waveform diagrams of FIG. 8, the operating principles of each state of the present invention in normal operation modes are explained as follows:

1. State 1: ($t_0 \leq t < t_1$)

Figure 7A:
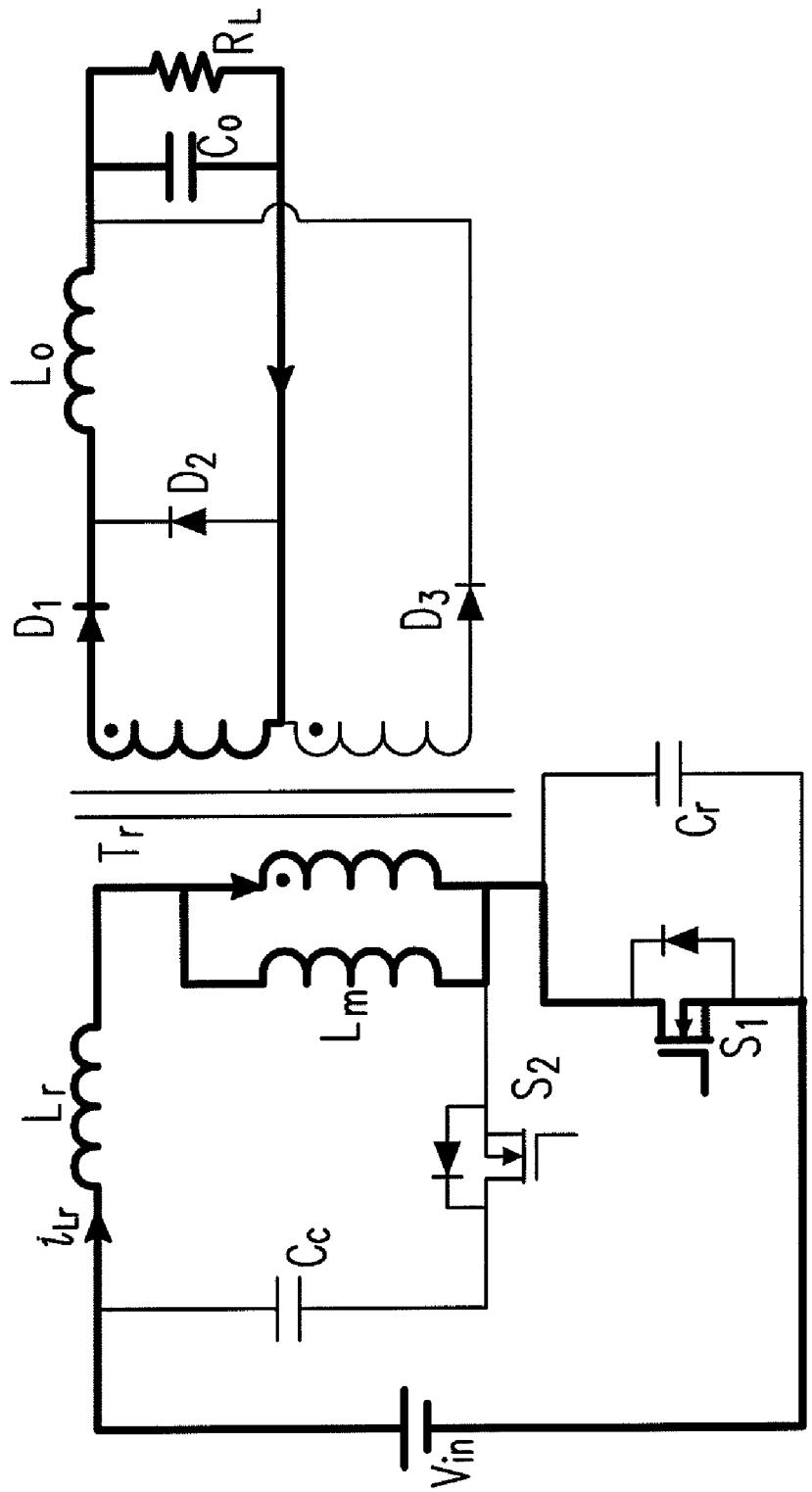
FIGS. 7(a)-7(h) respectively show topological state diagrams of a forward-flyback converter with the buck-boost type active-clamp circuit according to the first preferred embodiment of the present invention.
Figure 8:
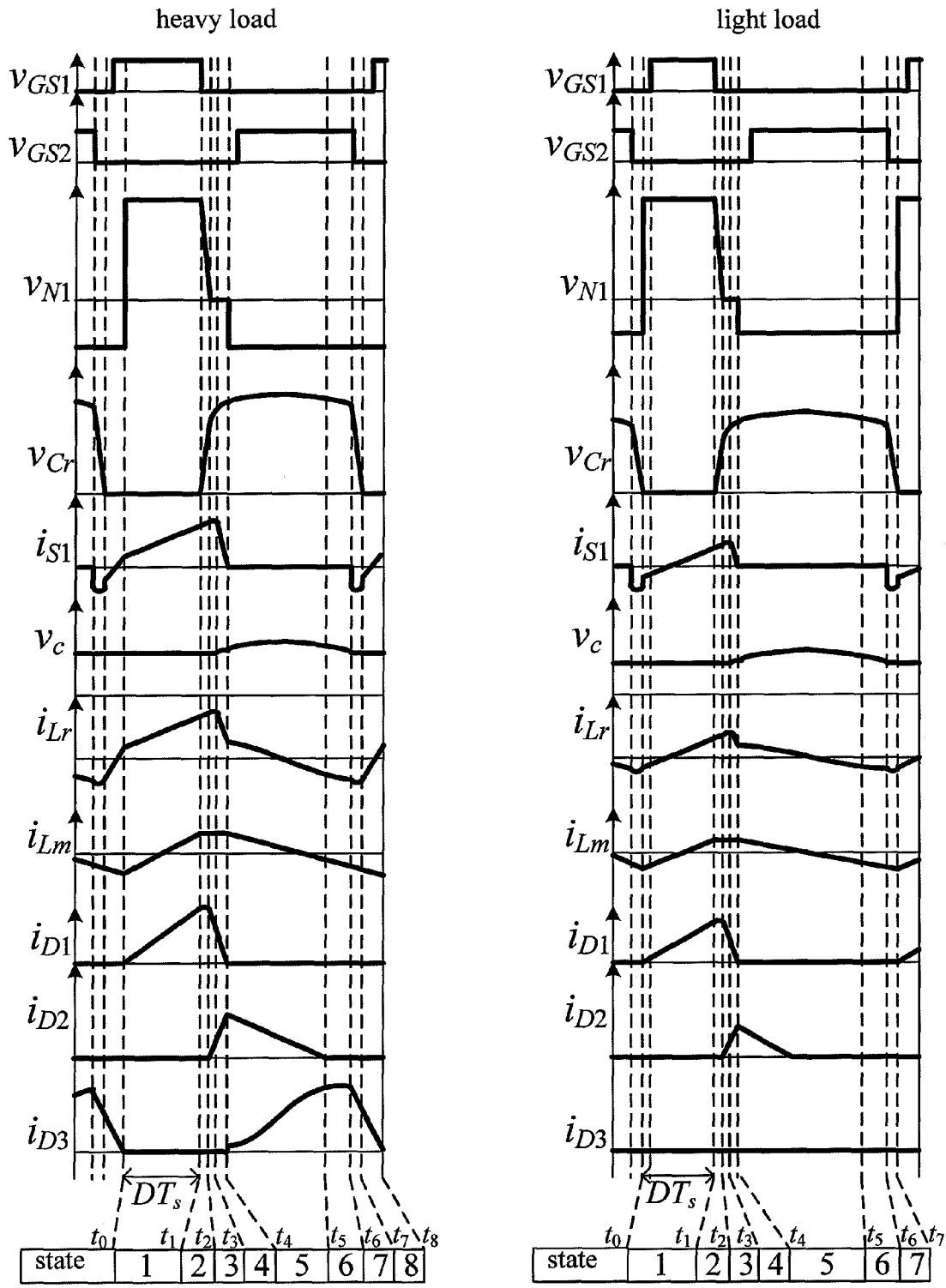
FIG. 8 shows respective waveform diagrams of a forward-flyback converter with the buck-boost type active-clamp circuit under heavy load and light load according to the first preferred embodiment of the present invention.

As shown in FIG. 7(a), in this state, the main switch S1 is turned on and the auxiliary switch S2 is turned off. The input DC voltage Vin equals the sum of the voltages across the resonant inductor Lr and the primary winding N1. Due to the positive voltage induced on the first secondary winding N2, the first diode D1 is conducted and the input energy is transmitted to the load $R_L$. Due to the negative voltage induced on the second secondary winding N3, the third diode D3 is reverse biased.

2. State 2: ($t_1 \leq t < t_2$)

Figure 7B:
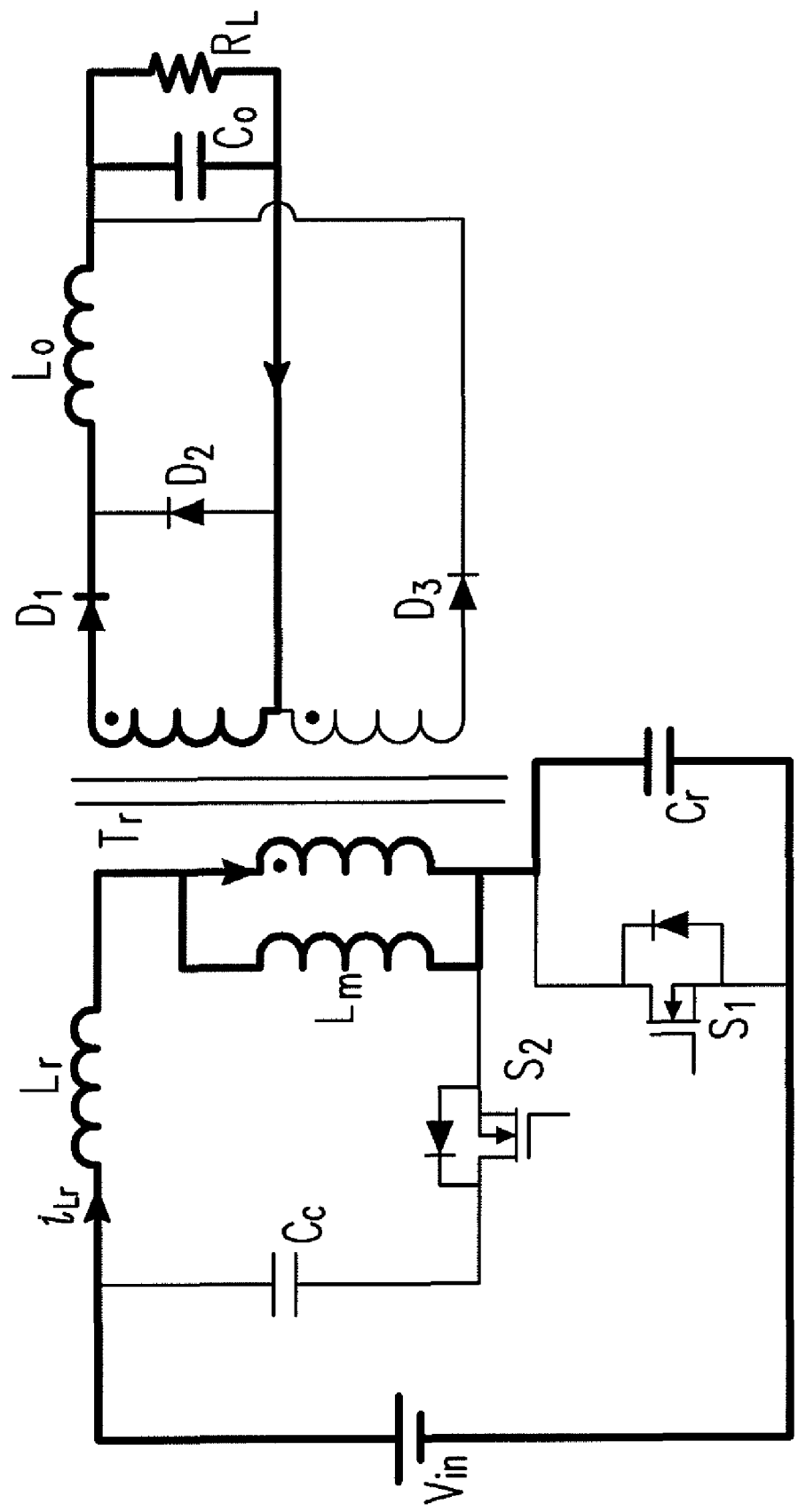

As shown in FIG. 7(b), the switches S1 and S2 are turned off in this state, the resonant capacitor Cr is charged by the primary side current of the transformer $i_{Lr}$. Since the capacitance of Cr is quite small, the voltage of the resonant capacitor Cr, $V_{Cr}$, is rapidly raised to Vin.

3. State 3: ($t_2 \leq t < t_3$)

Figure 7C:
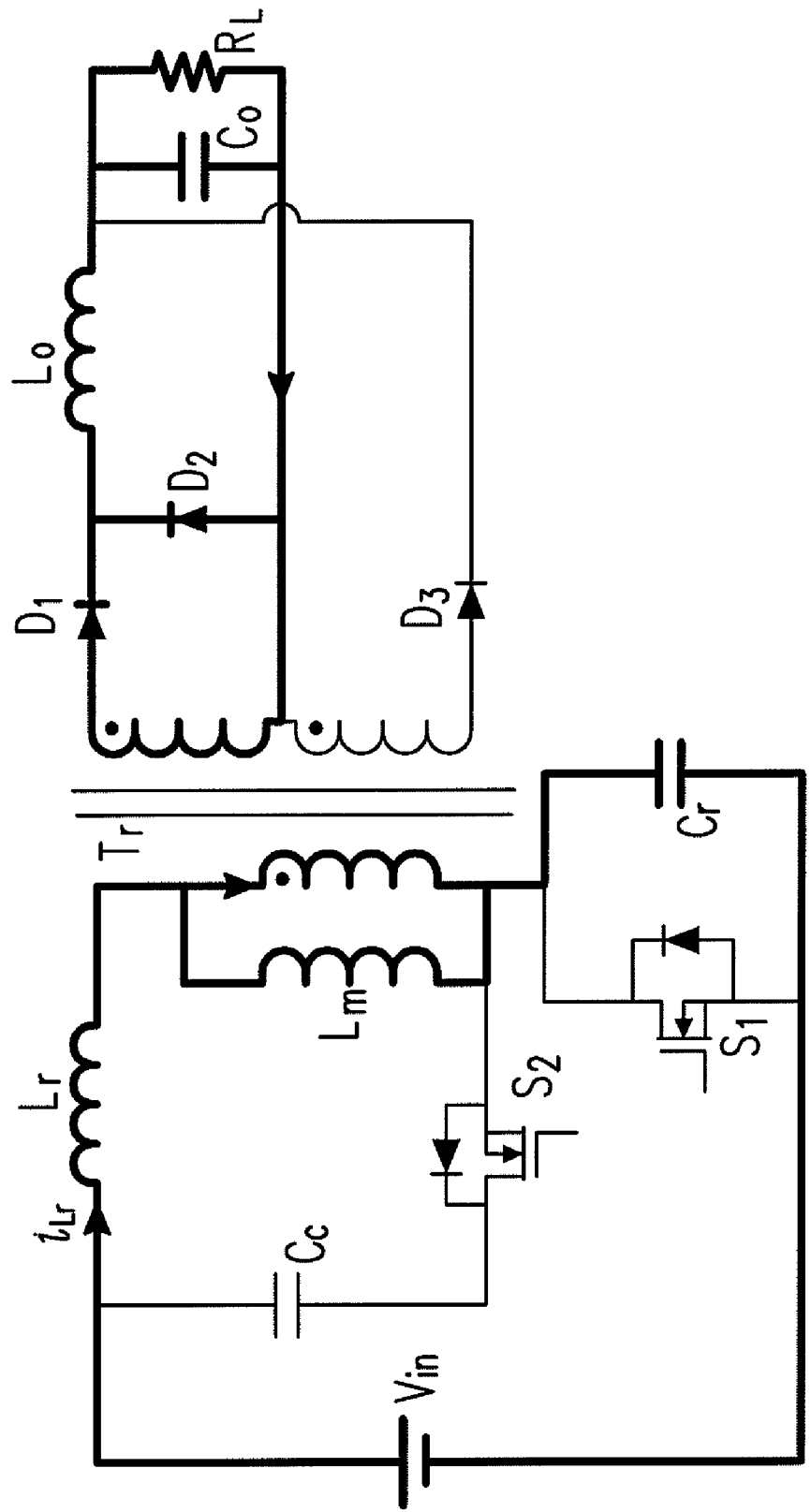

As shown in FIG. 7(c), $V_{Cr}$ rises to a high value making the voltage of the primary winding $V_{N1}$ equal zero. Thus, the first and the second diodes, D1 and D2, are simultaneously conducted. The energy stored in the output inductor Lo is transmitted to the load $R_L$, and the output inductor current $i_{Lo}$ decreases linearly. In this state, the resonant tank at the primary side comprises Lr and Cr.

4. State 4: ($t_3 \leq t < t_4$)

Figure 7D:
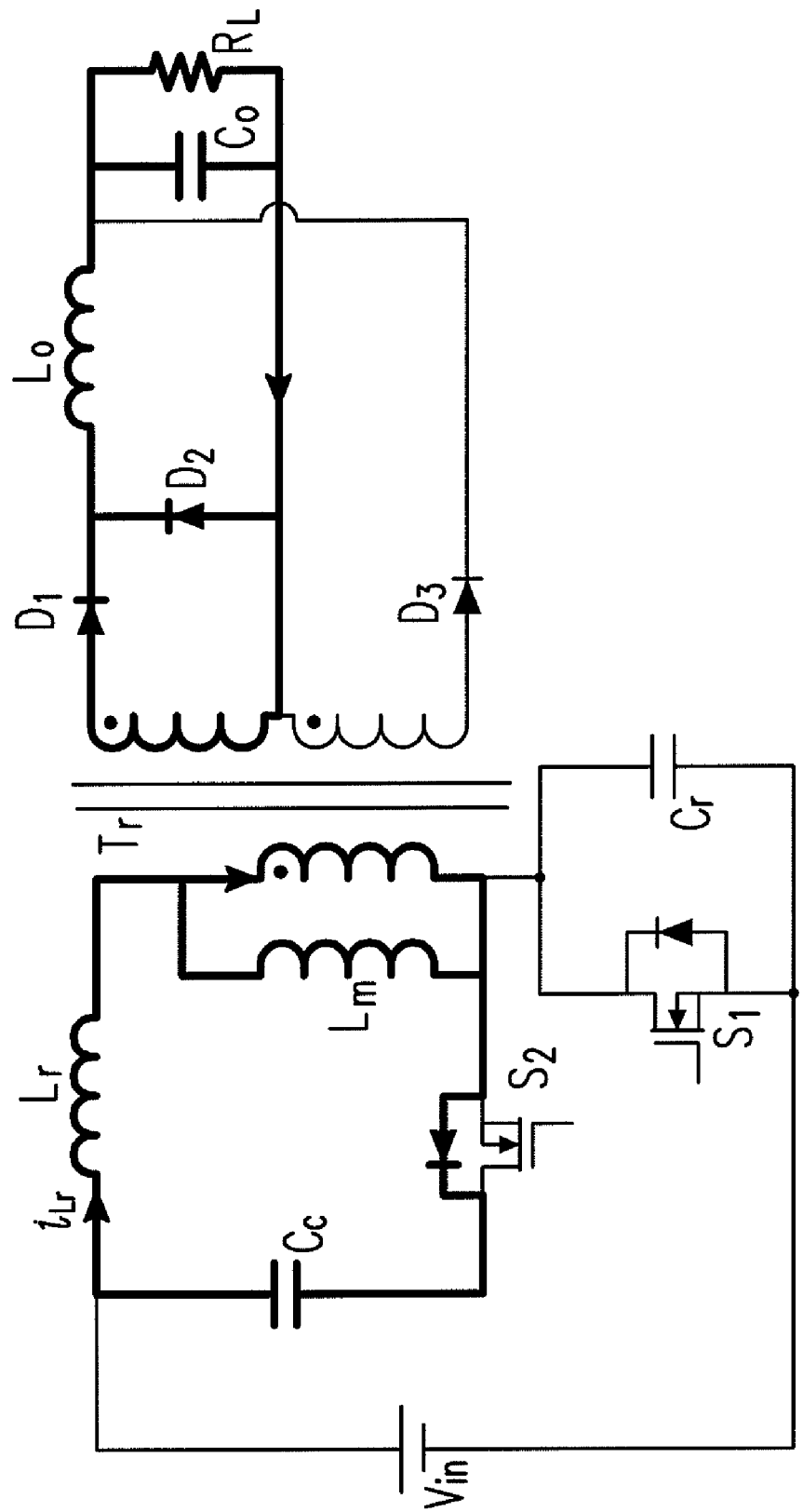

As shown in FIG. 7(d), $V_{Cr}$ rises to a value making the anti-parallel diode of S2 be conducted. The gradually increased $V_{Cr}$ causes the current $i_{Lr}$ to decrease gradually; thus, the winding current of the secondary side of the transformer, that is the current $i_{D1}$, is gradually decreased until $i_{D1}=0$ and the current $i_{D2}$ is gradually increased until $i_{D2}=i_{Lo}$. Before $i_{D1}$ decreases to zero, the primary side voltage $V_{N1}$ still keeps zero value.

5. State 5: ($t_4 \leq t < t_5$)

Figure 7E:
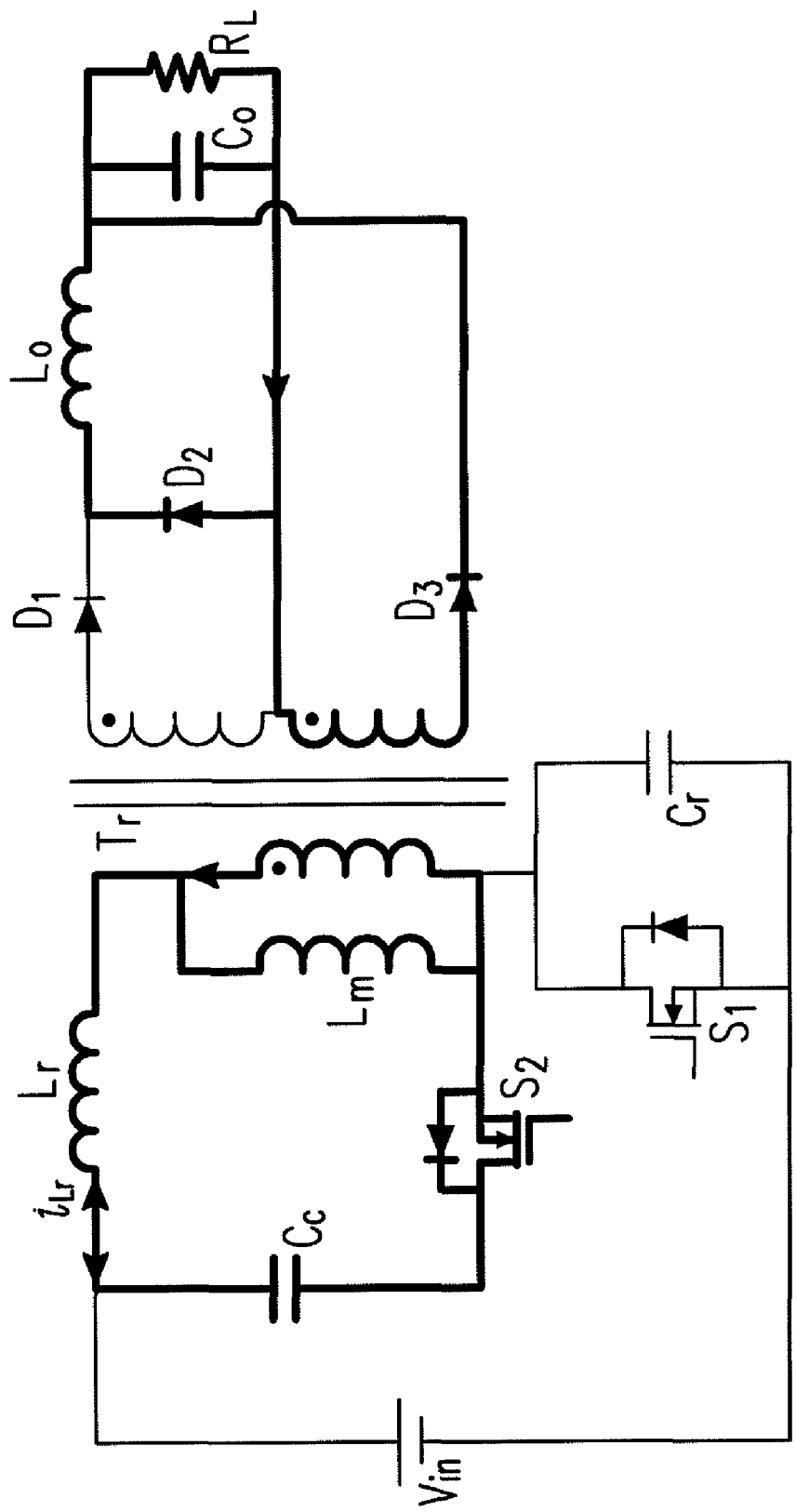

As shown in FIG. 7(e), in this state, $i_{Lr}$ decreases to a value that is smaller than $i_{Lm}$; thus, the primary winding current $i_{N1}$ turns into flowing out of the dot, and the second secondary winding N3 induces a current $i_{N3}$ flowing into the dot. Since the third diode D3 is conducted, the voltage of the primary winding $V_{N1}$ is clamped at $-Vo \cdot n1/n3$, and the resonant tank is formed by Lr and Cr. To achieve the ZVS of auxiliary switch S2, S2 must be turned on while $i_{Lr}$ is flowing through the anti-parallel diode of S2.

6. State 6: ($t_5 \leq t < t_6$)

Figure 7F:
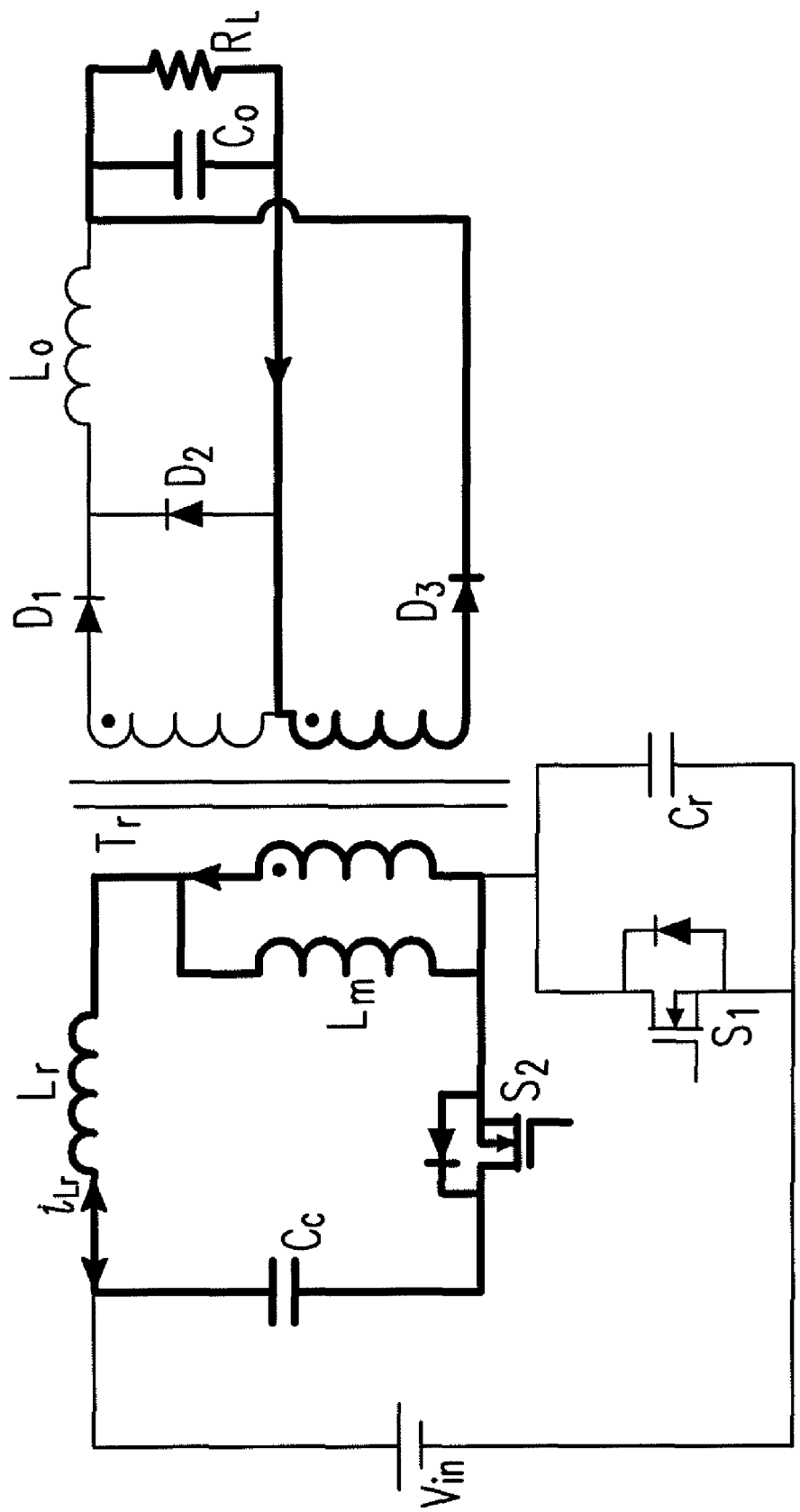

As shown in FIG. 7(f), the circuit analysis in this state is the same as that in State 5 except the output inductor current $i_{Lo}$ is zero.

7. State 7: ($t_6 \leq t < t_7$)

Figure 7G:
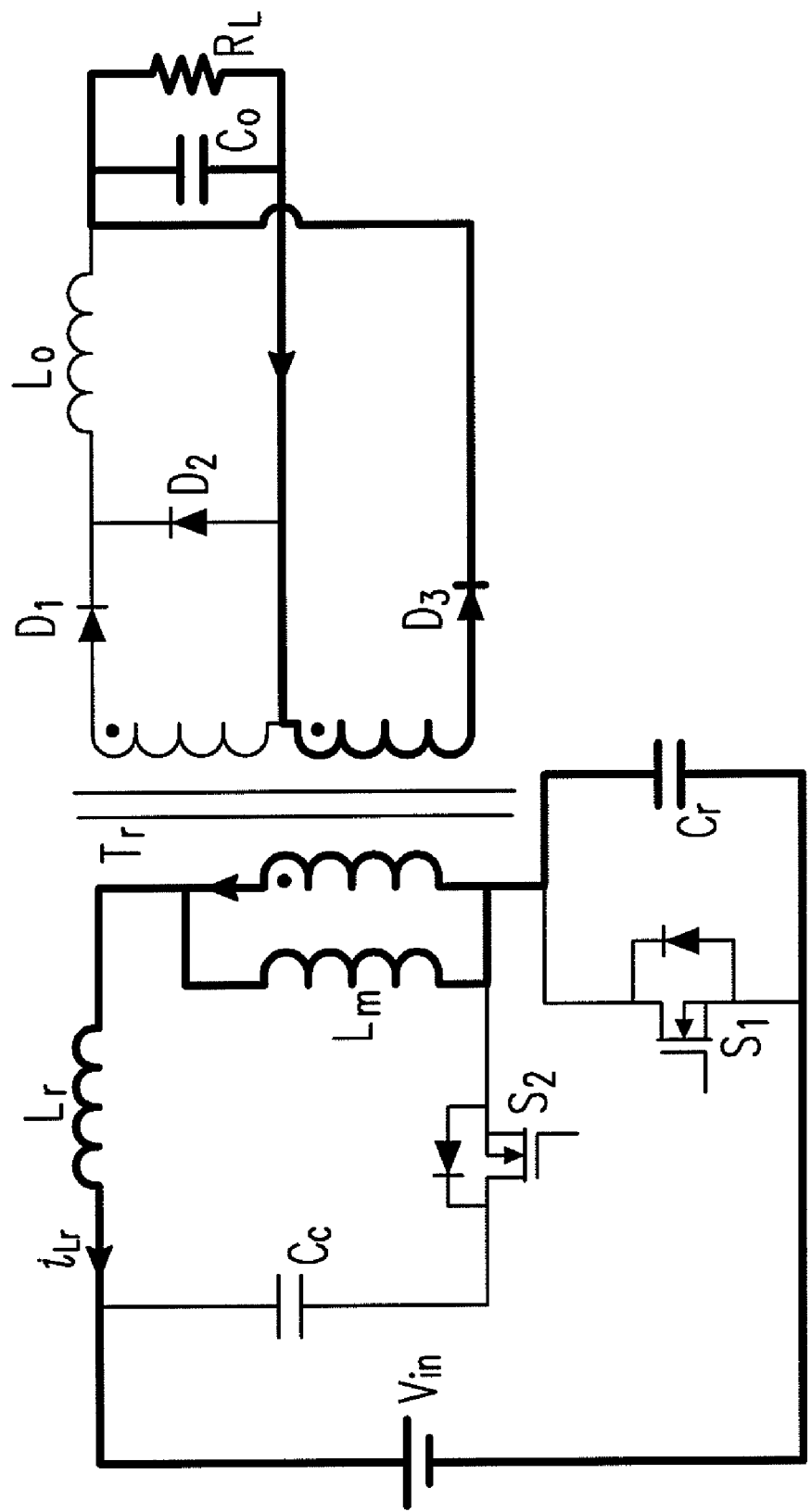

As shown in FIG. 7(g), the auxiliary switch S2 is turned off; thus, the path connected to the clamp capacitor Cc is cut off. The resonant inductor Lr and the resonant capacitor Cr form a new high frequency resonant loop. Through this new high frequency resonant loop, $i_{Lr}$ resonates in the negative direction to discharge the resonant capacitor Cr, and the voltage $V_{Cr}$ decreases to zero at time t7.

8. State 8: ($t_7 \leq t < t_8$)

Figure 7H:
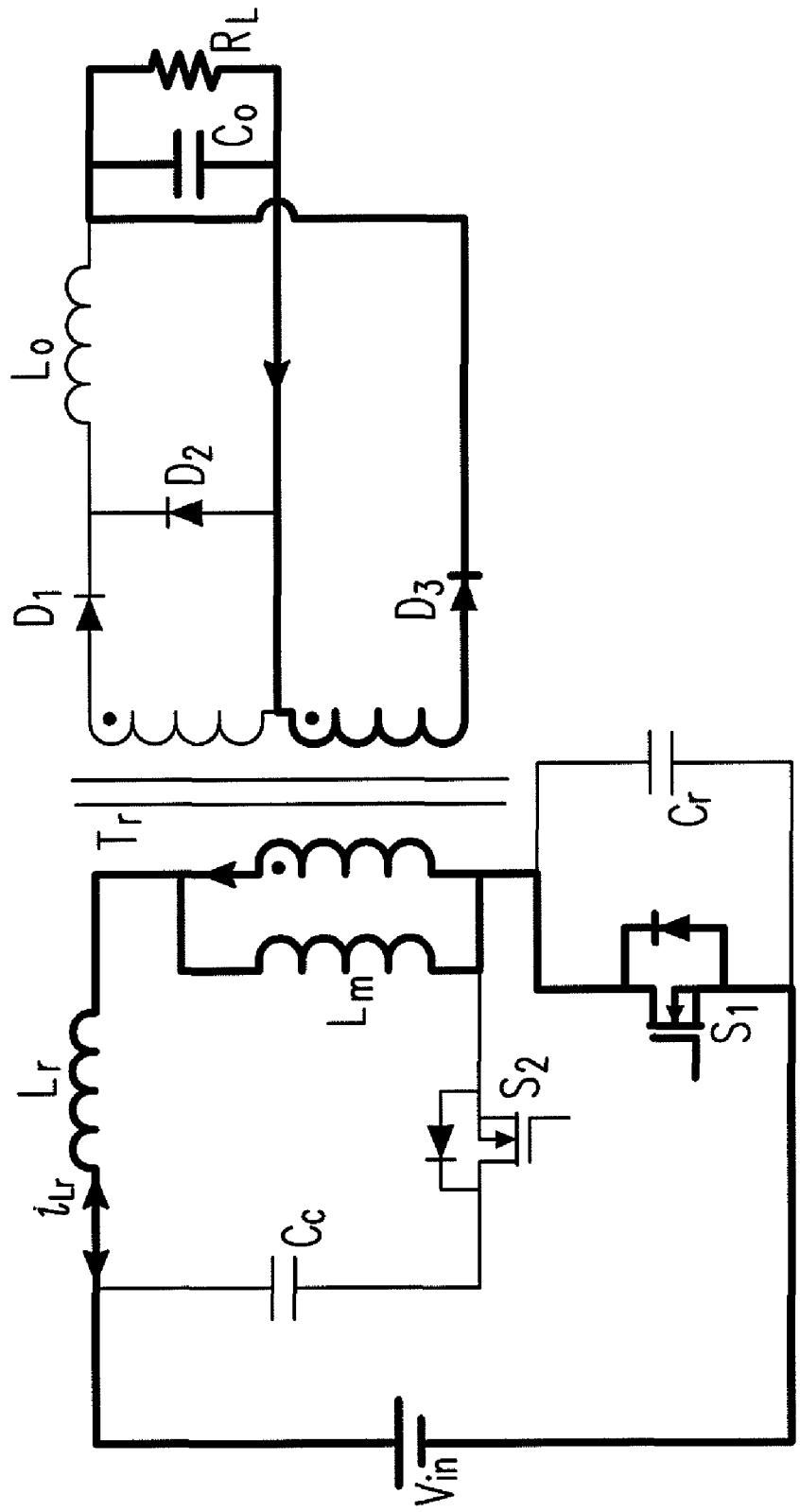

As shown in FIG. 7(h), after $V_{Cr}$ decreases to zero, the anti-parallel diode of main switch S1 begins to conduct. To achieve the ZVS of main switch S1, S1 is turned on while the anti-parallel diode of S1 is conducting. In this state, the winding voltages of the transformer are still clamped by the output voltage Vo; thus, $i_{Lr}$ is increased linearly with the slope of $(V_{in}+V_o \cdot n_1/n_3)/L_r$. Also, the current $i_{N3}$ decreases linearly and becomes zero at time t8.

As shown in FIG. 8, under the light load condition, the flyback sub-circuit of the present invention is inactive ($i_{N3}=0$). The aforesaid function is similar to the phase shedding of the multi-phases synchronous rectifier VRM and could reduce the power losses of the elements and the traces. Moreover, since the flyback sub-circuit is inactive, the present invention is equivalent to an active-clamp forward converter operating in DCM. When the main switch current $i_{S1}$ turns from negative into positive, the slope of $i_{S1}$ is relatively gradual. As a result, the interval in which is, remains negative will be prolonged and this feature facilitates to realize the ZVS of S1 under the light load condition. These aforementioned functions are beneficial to the improvement of the conversion efficiency.

Figure 1:
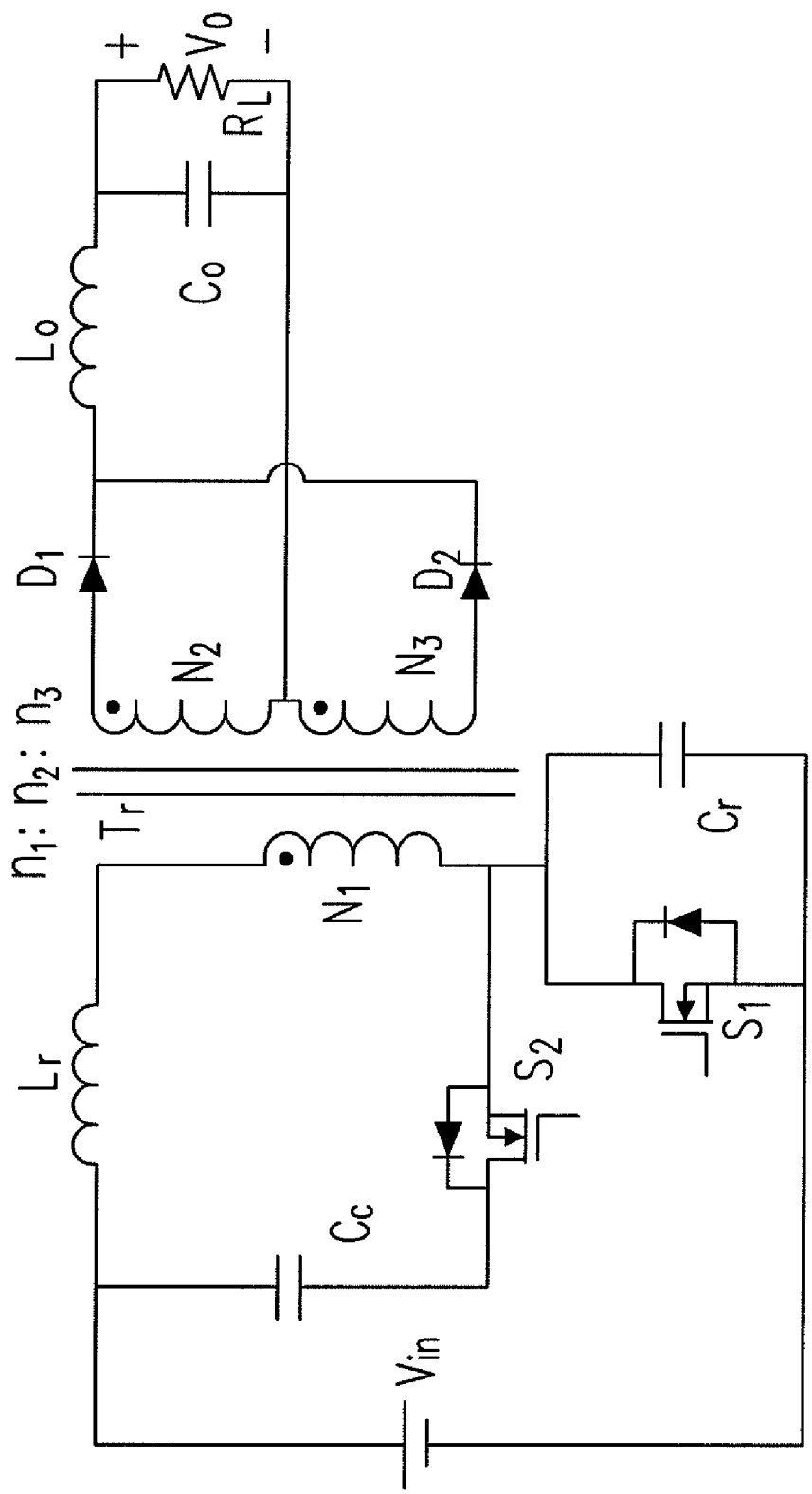
FIG. 1 shows a circuit diagram of a conventional active-clamp forward-flyback converter.
Figure 2:
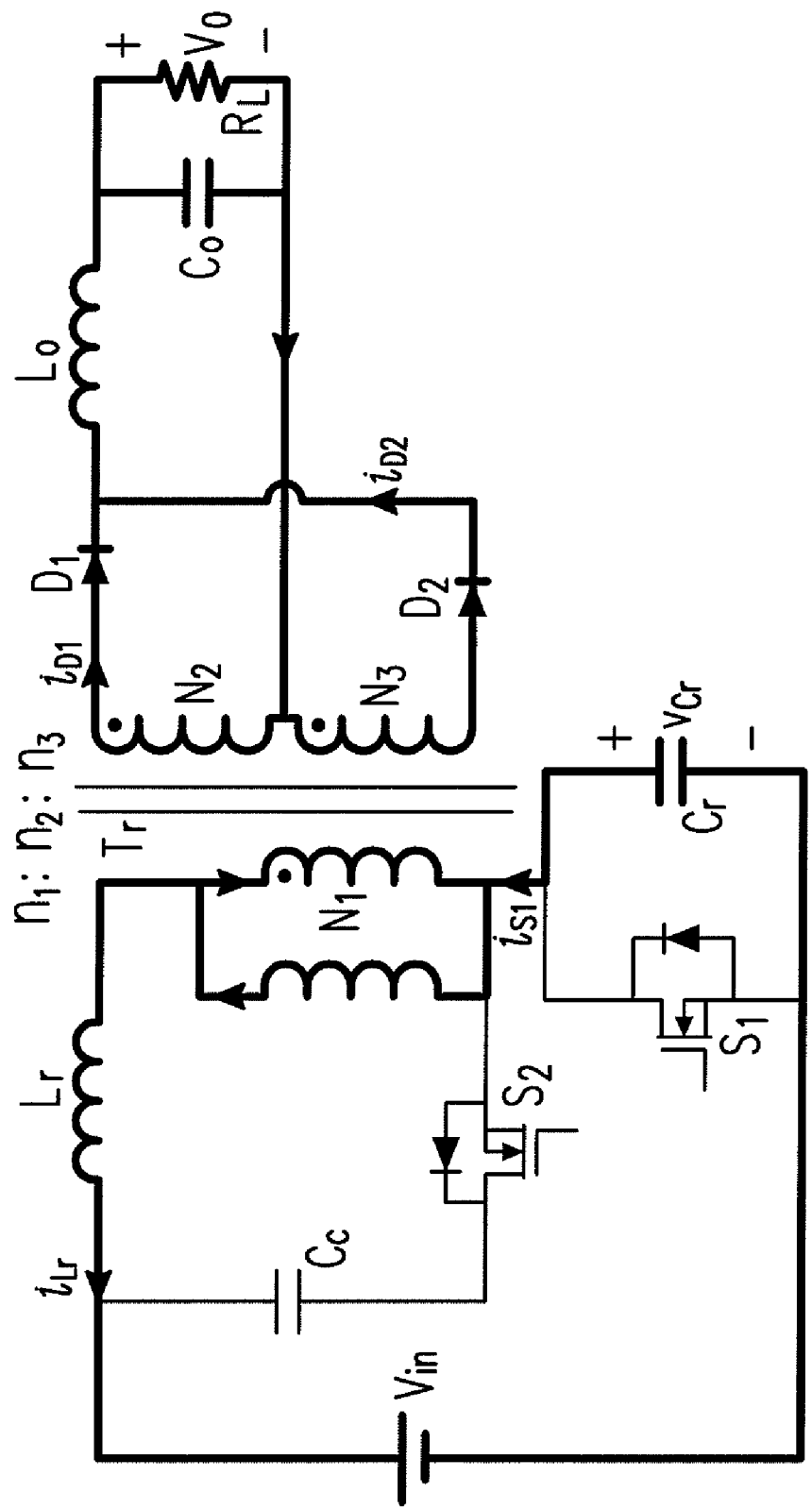
FIG. 2 is a topological state diagram illustrating the discharge process of the parasitic capacitance of switches of a conventional active-clamp forward-flyback converter.

Comparing to the conventional active-clamp forward-flyback converter, although an extra freewheeling diode D2 is required in the present invention, the reverse biased voltages of all the diodes are lower than those of the former. Thus, the diodes have low voltage rating and are more cost-effective. As seen in FIG. 1, the reverse biased voltages of the diodes (voltage across cathode and anode) of the conventional active-clamp forward-flyback converter are given as follows:

$$V_{KA,D1} = 2 \cdot V_{in} \cdot \frac{D}{1-D} \cdot \frac{n_2}{n_1}$$

$$V_{KA,D2} = 2 \cdot V_{in} \cdot \frac{n_2}{n_1}$$

As seen in FIG. 3, the reverse biased voltages of diodes (voltage across cathode and anode) in the first preferred embodiment of the present invention are given as follows:

$$V_{KA,D1} = V_{in} \cdot \frac{D}{1-D} \cdot \frac{n_2}{n_1}$$

$$V_{KA,D2} = V_{in} \cdot \frac{n_2}{n_1}$$

$$V_{KA,D3} = V_{in} \cdot \frac{n_3}{n_1} + V_o$$

Figure 9:
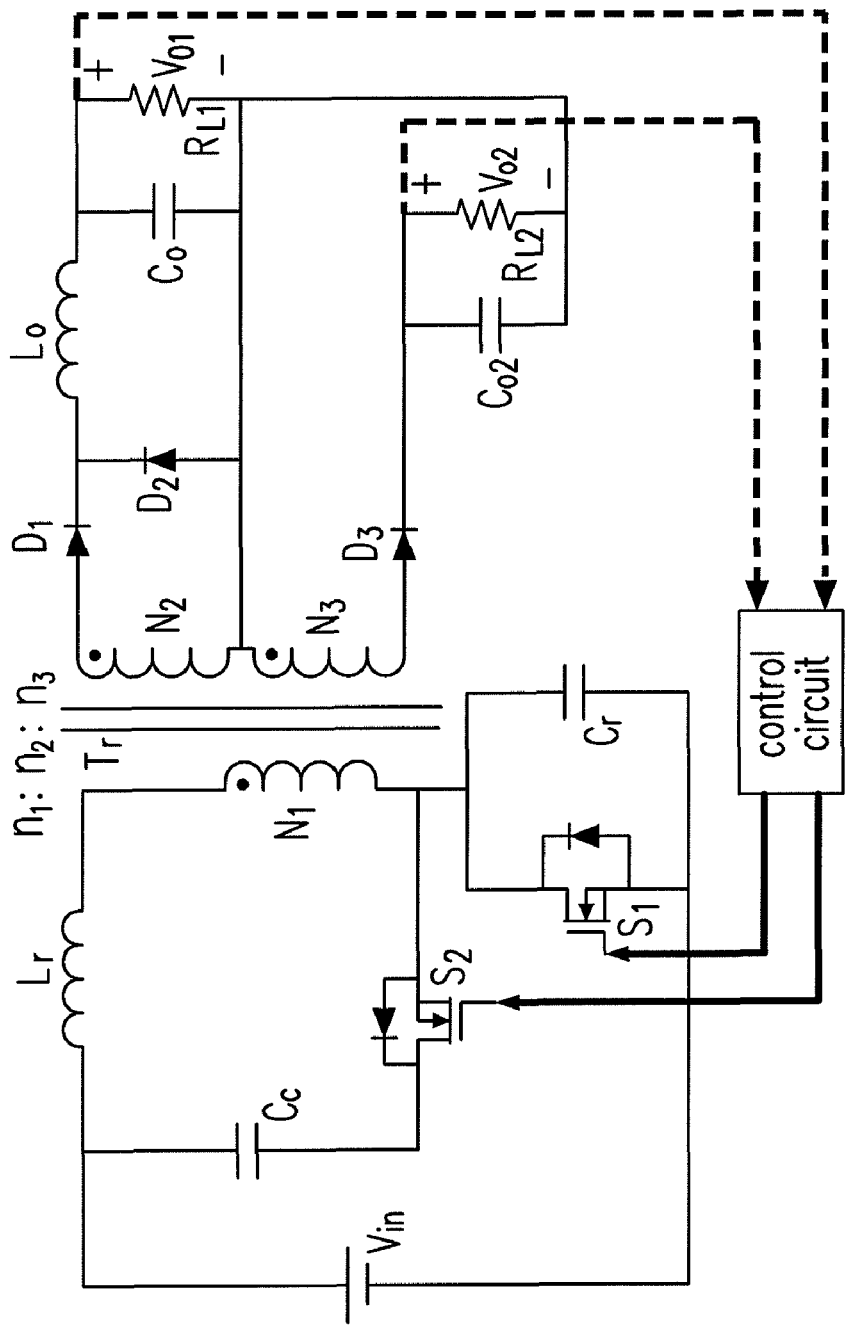
FIG. 9 shows a circuit diagram of a multiple output forward-flyback converter with the buck-boost type active-clamp circuit according to the fourth preferred embodiment of the present invention.

Based on the present invention, a multi-outputs topology variation could be developed. FIG. 9 shows a circuit diagram of a multi-outputs forward-flyback converter with buck-boost active-clamp circuit according to the fourth preferred embodiment of the present invention. In which, the forward sub-circuit connected to a first output capacitor Co1 and a first load $R_{L1}$ is in charge of a main output Vo1 (the first DC output voltage); the flyback sub-circuit connected to a second output capacitor Co2 and a second load $R_{L2}$ is in charge of a secondary output Vo2 (the second DC output voltage). The total number of the secondary outputs could be increased as required. This design could be applicable to power supply in which multiple outputs are required. When the load current of the main output becomes small, the duty cycle ratio D will decrease automatically to cause the secondary output to be inactive. The starting point of this operation could be arranged at the time instant when the system enters standby mode to achieve power saving by deactivating the unnecessary power output.

According to the aforementioned descriptions, the present invention provides an active-clamp forward-flyback converter for load variation in a wide range and having relatively better conversion efficiency under both the heavy and light loads. Under the heavy load condition, the ZVS scheme of the active-clamp flyback converter is employed to improve the drawback of having insufficient resonant current in the conventional active-clamp forward-flyback converter. Under the light load condition, the time interval in which the resonant current turns into positive from negative is prolonged to assure that the main switch could achieve ZVS. Meanwhile, the diode of the flyback sub-circuit is reverse biased such that this sub-circuit could be inactive, and therefore the unnecessary element power losses are reduced.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A forward-flyback DC/DC converter, comprising:
    an isolated transformer having a primary winding, a first secondary winding and a second secondary winding, wherein the two secondary windings are connected in series to form a center-tapped configuration and their common node is grounded;
    a main switch;
    an output capacitor having a positive terminal and a negative terminal;
    an output load;
    a forward sub-circuit having an output and comprising:
        an output inductor operating in discontinuous conduction mode;
        the first secondary winding transmitting input energy to the output inductor, the output capacitor and the output load via the transformer when the main switch is turned on;
        a first diode forwardly transmitting a secondary side current to the output when the main switch is turned on; and
        a second diode providing flywheeling function to transmit energy stored in the output inductor to the output when the main switch is turned off;
    a flyback sub-circuit operating in continuous conduction mode and comprising:
        the second secondary winding providing magnetic reset of the transformer when the main switch is turned off; and
        a third diode having an anode connected to the second secondary winding in series and a cathode connected to the positive terminal of the output capacitor to directly transmit magnetic reset energy of the transformer to the output; and
    an active-clamp circuit clamping voltage spike of the main switch and engaging in magnetic reset of the transformer when the main switch is turned off.

2. A converter according to claim 1, wherein the active-clamp circuit is selected from a group consisting of a buck-boost, a boost and a buck type active-clamp circuits.

3. A converter according to claim 2 further comprising one of a DC power source and a rectified AC line voltage source having a positive and a negative terminals, wherein the primary winding has a first and a second terminals, the main switch is a MOSFET having a parasitic capacitance, an anti-parallel diode, a drain connected to the second terminal of the primary winding, a source connected to the negative terminal of the DC power source and a gate, the resonant capacitor being the sum of the parasitic capacitances of the main and the auxiliary switches is connected to the drain and the source of the main switch in parallel, the buck-boost active-clamp circuit comprises an auxiliary switch being a MOSFET and having a drain, a source connected to the second terminal of the primary winding, a gate, an anti-parallel diode and a parasitic capacitance, a resonant inductor having a first terminal and a second terminal connected to the first terminal of the primary winding, a clamp capacitor having a first terminal connected to the drain of the auxiliary switch and a second terminal connected to the first terminal of the resonant inductor and the positive terminal of the DC power source, the output capacitor is connected to the output load in parallel, the positive terminal of the output capacitor connects to the second terminal of the output inductor, and the negative terminal of the output capacitor and the anode of the second diode are connected to secondary side ground of this converter.

4. A converter according to claim 2 further comprising a DC power source having a positive and a negative terminals, wherein the boost active clamp circuit comprises an auxiliary switch being a MOSFET and having a drain connected to the negative terminal of the DC power source and primary side ground, a source, a gate and an anti-parallel diode, a resonant inductor having a first terminal connected to the positive terminal of the DC power source and a second terminal connected to the first terminal of the primary winding and a clamp capacitor having a first terminal connected to the second terminal of the primary winding and a second terminal connected to the source of the auxiliary switch.

5. A converter according to claim 2 further comprising a DC power source having a positive and a negative terminals, wherein the buck active clamp circuit comprises an auxiliary switch being a MOSFET and having a drain connected to the positive terminal of the DC power source, a source connected to the drain of the main switch, a gate and an anti-parallel diode, a resonant inductor having a first terminal and a second terminal connected to the first terminal of the primary winding, and a clamp capacitor having a first terminal connected to the drain of the auxiliary switch and a second terminal connected to the first terminal of the resonant inductor.

6. A converter according to claim 1 further comprising a control circuit controlling the converter to provide a stable and regulated output voltage.

7. A converter according to claim 6, wherein the active clamp circuit further comprises an auxiliary switch, the main switch and the auxiliary switch have respective duty ratios, and the control circuit is a constant frequency PWM control circuit controlling respective duty ratios of the main switch and the auxiliary switch so as to regulate the output voltage to a stable state.

8. A converter according to claim 6, wherein the control circuit comprises:
an output voltage feedback circuit and an photo-coupler feed-backing an output voltage signal and isolating input signals and output signals of the converter;
a PWM control and frequency response compensation circuit connected to the output voltage feedback circuit and the photo-coupler and regulating a steady state response and a dynamic response of the output voltage;
an Inverter gate connected to the PWM control and frequency response compensation circuit and providing a control signal required by the auxiliary switch;
a first dead time adjustment circuit connected to the PWM control and frequency response compensation circuit and adjusting a dead time of a duty cycle of the main switch;
a second dead time adjustment circuit connected to the Inverter gate and adjusting a dead time of a duty cycle of the auxiliary switch to avoid shoot through of the main and the auxiliary switches via injecting the two dead times; and
a gate driving circuit of high side and low side switches connected to the first and the second dead time adjustment circuits and providing two respective gate driving signals for the main and the auxiliary switches.

9. A forward-flyback DC/DC converter, comprising:
an isolated transformer having a primary winding, a first secondary winding and a second secondary winding, wherein the two secondary windings are connected in series to form a center-tapped configuration and their common node is grounded;
a main switch;
an output capacitor having a positive terminal and a negative terminal;
an output load;
a forward sub-circuit having an output and comprising:
an output inductor operating in discontinuous conduction mode;
the first secondary winding transmitting input energy to the output inductor, the output capacitor and the output load via the transformer when the main switch is turned on;
a first synchronous rectifier switch forwardly transmitting a secondary side current to the output when the main switch is turned on; and
a second synchronous rectifier switch providing flywheeling function and transmitting energy stored in the output inductor to the output when the main switch is turned off;
a flyback sub-circuit operating in continuous conduction mode and comprising:
the second secondary winding providing magnetic reset of the transformer when the main switch is turned off; and
a third synchronous rectifier switch having an first terminal connected to the second secondary winding in series and a second terminal connected to the positive terminal of the output capacitor to directly transmit magnetic reset energy of the transformer to the output; and
an active-clamp circuit clamping voltage spike of the main switch and engaging in magnetic reset of the transformer when the main switch is turned off.

10. A converter according to claim 9, wherein the first, the second and the third synchronous rectifier switches are MOSFETs with anti-parallel diodes such that the converter is applicable to the situation in which a relatively low output voltage and a relatively large output current is required.

* * * * *